No. 627,092. Patented June 20, 1899.
J. W. BONTA.
PROCESS OF AND APPARATUS FOR MANUFACTURING GLASS PIPE.
(Application filed Nov. 11, 1897.)
(No Model.) 3 Sheets—Sheet 1.
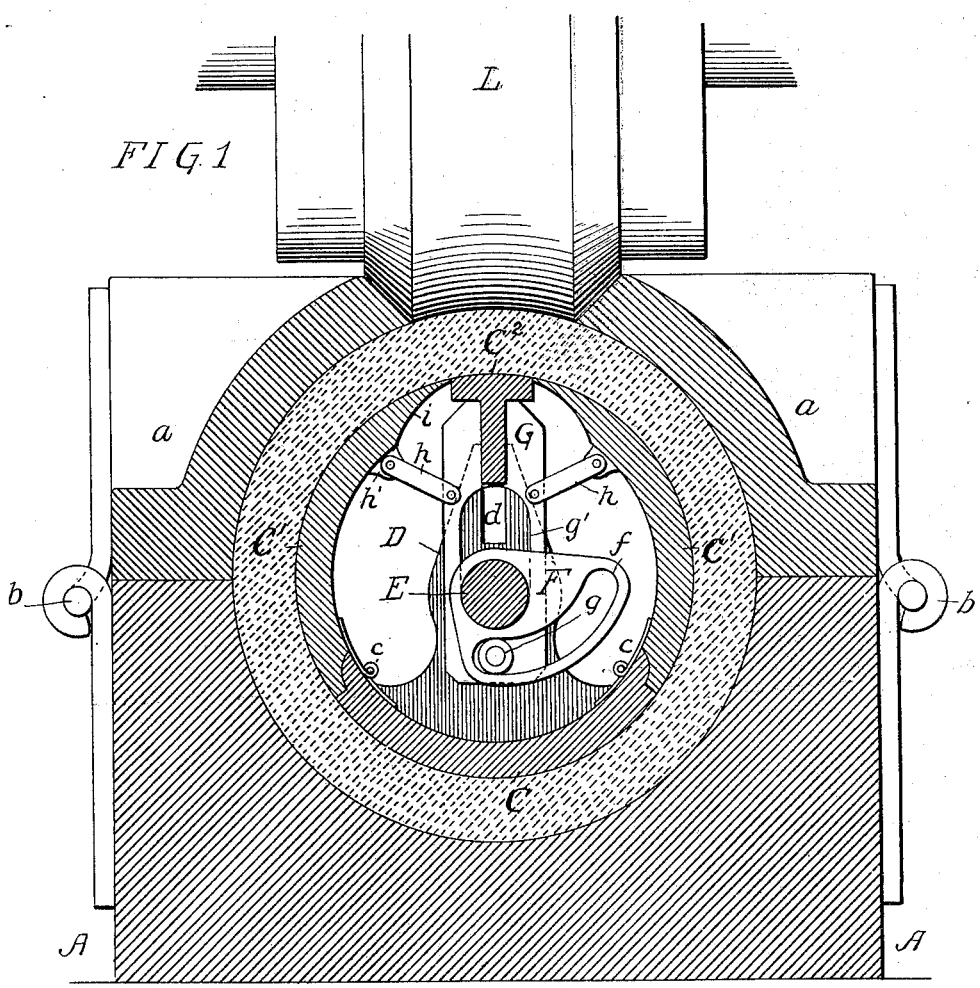
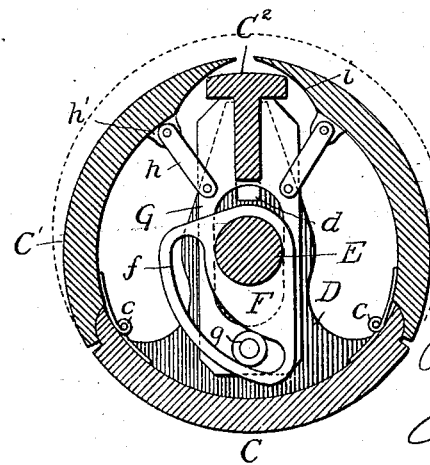

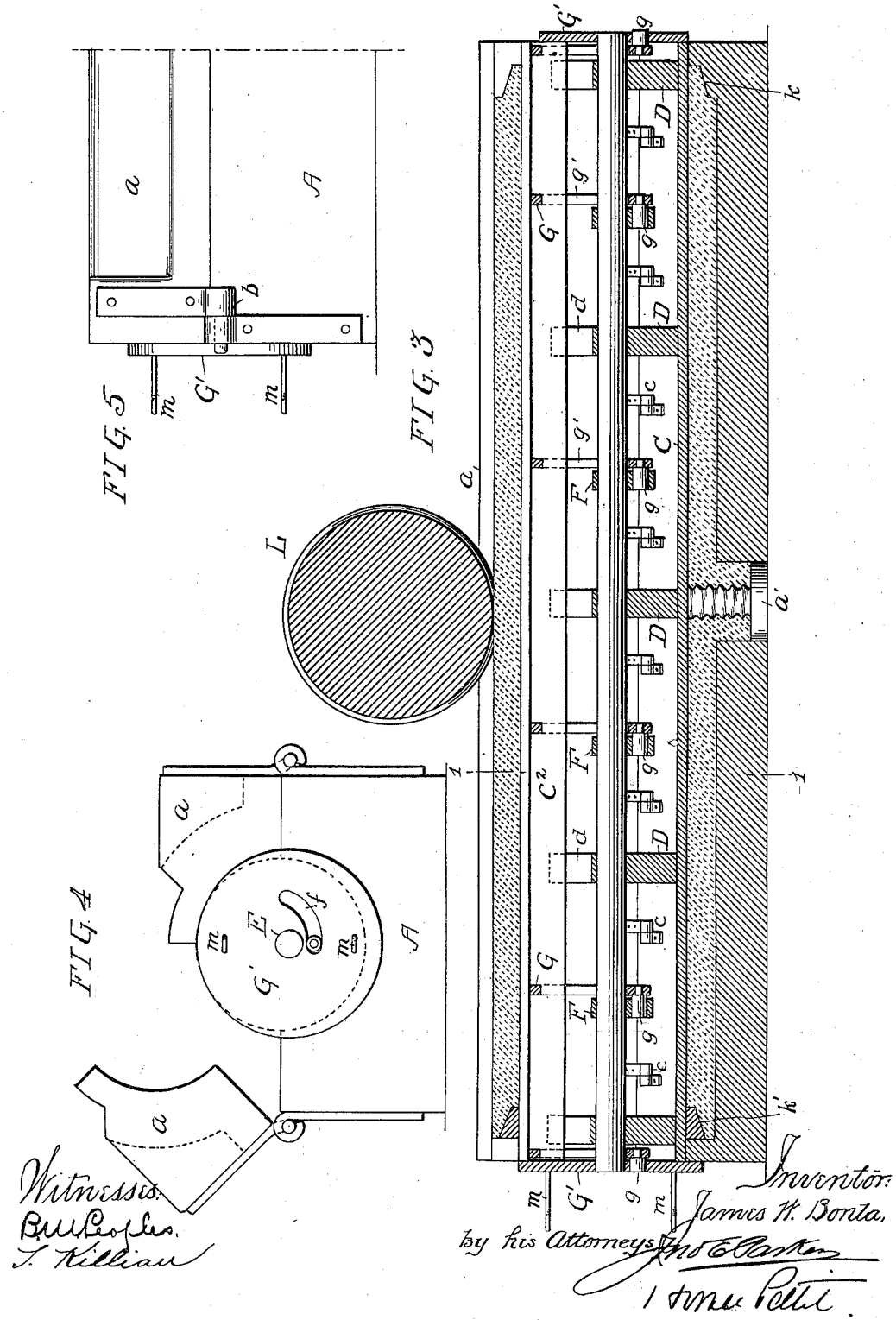

No. 627,092. Patented June 20, 1899.
J. W. BONTA.
PROCESS OF AND APPARATUS FOR MANUFACTURING GLASS PIPE.
(Application filed Nov. 11, 1897.)
(No Model.) 3 Sheets—Sheet 3.
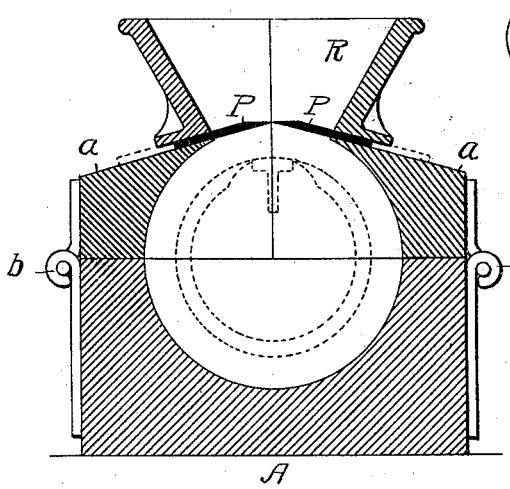
FIG. 6
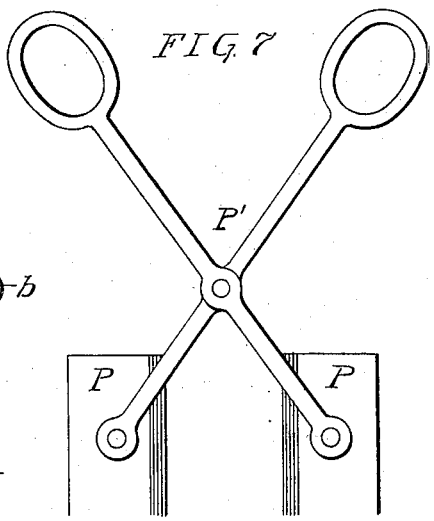
FIG. 7
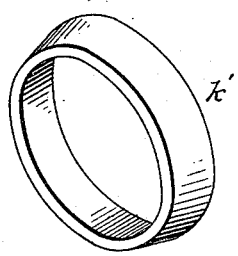
FIG. 8
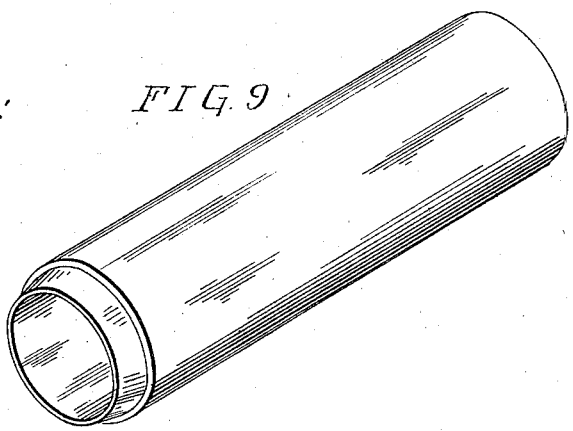
FIG. 9
FIG. 10

UNITED STATES PATENT OFFICE.

JAMES W. BONTA, OF WAYNE, PENNSYLVANIA, ASSIGNOR TO THE BONTA GLASS PIPE AND CONDUIT COMPANY, OF SCRANTON, PENNSYLVANIA.

PROCESS OF AND APPARATUS FOR MANUFACTURING GLASS PIPE.

SPECIFICATION forming part of Letters Patent No. 627,092, dated June 20, 1899.

Application filed November 11, 1897. Serial No. 658,136. (No model.)

*To all whom it may concern:*

Be it known that I, JAMES W. BONTA, a citizen of the United States, and a resident of Wayne, Delaware county, State of Pennsylvania, have invented a certain Improved Process of and Apparatus for Manufacturing Glass Pipe, of which the following is a full, clear, and exact description, reference being had to the accompanying drawings, forming part of this specification.

My invention relates to a certain improved process of and apparatus for manufacturing glass pipes, and has for its object the manufacture of glass pipes of any required diameter and principally intended to replace metallic pipes for conducting water or other liquids or gas or similar substances under ground, although the diameter of the pipe may be increased to serve for sewage purposes, if desired.

The pipe most commonly employed for conducting water and similar fluids is made of iron, and owing to the rapid oxidation which takes place and the danger incurred from electrolysis in the neighborhood of electric street-railways or underground electrical conductors the life of the pipe is materially shortened and often proves a source of danger and inconvenience, where, owing to the presence of an electric current, the iron of the pipe is gradually destroyed, this being especially the case in mining districts, where the water is likely to be polluted with mineral matter.

In the accompanying drawings, Figure 1 is a sectional elevation, on an enlarged scale, on the line 1 1, Fig. 3, of an apparatus for manufacturing glass pipe in accordance with my invention. Fig. 2 is a similar view of the collapsible core on which the glass is cast. Fig. 3 is a longitudinal section of the apparatus drawn to a somewhat smaller scale. Fig. 4 is an end elevation of the same. Fig. 5 is a side elevation of one end of the apparatus. Fig. 6 is a view similar to Fig. 1, illustrating a slightly-modified construction of apparatus. Fig. 7 is a plan view of a portion of the apparatus shown in Fig. 6 with the hopper removed. Fig. 8 is a perspective view of a detail of construction. Fig. 9 is a perspective view of one form of glass pipe which may be manufactured, and Fig. 10 is sectional view of a conduit made up of a series of interjointed sections of pipe.

Referring to the drawings, A represents the bottom section of a mold formed of iron or other suitable metal, and to this bottom section are hinged top or side sections $a$, the point of connection or contact between the hinged sections being on the horizontal diameter of the mold, so that when the top sections are thrown back or removed the pipe may be readily removed and transferred to the annealing-oven. The top sections $a$ are separated at the upper central portion of the mold by a space sufficient to permit the pouring of glass, and the hinges $b$, which serve to connect the sections, are of the ordinary pin-and-socket construction, so that when occasion requires the sections may be readily separated.

The inner diameter of the pipe manufactured is governed by a contractile core, the construction of which is more clearly shown in Figs. 1, 2, and 3. To the base-section C of the core are hinged two side wings $C'$, which may be moved to and fro from the contracted to the expanded positions on hinges $c$, the point of contact between the base-section and hinged sections being on a curved line concentric with the center of the hinge. From the base-section extend a number of guiding-blocks D, the upper ends of which are slotted at $d$ for the reception and guidance of the web or flange of a vertically-movable filling-bar $C^2$, the outer surface of which when the core is expanded forms a portion of the periphery of the core, and when the core is contracted the bar is lowered to such position that the hinged sections inclose it. In the blocks D is supported a shaft E, to which are secured at intervals a number of cam-blocks F, having slotted cams $f$, in which fit antifriction-rollers $g$, carried by plates G, which are secured to the filling-bar $C^2$. At each end of the core the shaft is secured to disks or plates $G'$, similarly provided with cam-slots $f$ for the reception of the rollers of the blocks G at the ends of the filling-bar. Each of the blocks G is provided with a vertical slot $g'$, through which the shaft E may pass, the shaft forming a guide for the block and serving to keep the antifriction-rollers g in proper position, and each block G is connected by links h to lugs h', formed on the inner sides of the hinged sections C'. In order to provide for the free inward movement of the hinged sections, the inner surface of each section adjacent to the bar C² is cut away at i and forms a comparatively sharp edge, so that after the filling-block commences its inward movement in the contracting of the core the hinged sections will be free to move from the position shown in Fig. 1 to that illustrated in Fig. 2.

In the manufacture of a pipe-section such as illustrated in Fig. 9, with male and female joints at the opposite ends, the flange at one side of the pipe may be formed by providing the mold-sections with an annular ring k, and the socket at the opposite end is formed by placing upon the contracting core a ring k', such as that illustrated in Fig. 8. It is to be noted that while the top sections a of the mold are separated for the greater part of their length each section is so formed that when in the closed position the extreme ends of the mold will be entirely closed, so as to form smooth ends upon the pipes.

In operation the mold and core having been previously heated to a degree sufficient to prevent the checking of the glass are placed in position with the core fully expanded, and molten glass is gradually poured into the mold through the space between the sections a until a proper quantity of glass has been introduced to completely fill the mold. A heated roller L, having a suitably-shaped peripheral surface, is then placed upon the molten glass, being supported by the inclined edges of the sections a, and is rolled from end to end of the glass pipe, forming a smooth surface upon the pipe at the point between the edges of the sections a, removing the surplus glass and compressing and compacting the glass within the mold, so as to insure a perfect pipe-section. The contact of the glass with the metal of the mold and core will almost immediately lower the temperature of the glass, and the resultant contracting would destroy the pipe if the core remained for any length of time in its fully-expanded condition. To permit the gradual contraction of the glass and at the same time to afford a support for the mass of glass before it has set and while still in a semiplastic condition, the core is contracted by a turning of the shaft E and causing the cams f to act upon the filling-bar and the hinged sections of the core. The turning of the shaft is readily effected by means of small rods m, projecting from one of the end plates G', and these may also be employed in the removal of the core after the pipe has set sufficiently to permit of its removal to the annealing-oven. The skins which form on both the inner and the outer surfaces of the pipe from contact with the metal will in a measure support the inner and semiplastic body of the glass, but if exposed in one position to the heat of the oven the weight of the mass will cause the pipe to sag and become distorted and unfit for use. To prevent this, it is necessary to constantly change the surface of the pipe in contact with the floor of the oven, and the pipe is kept slowly moving by hand or by any suitable mechanism until it has hardened or set to an extent sufficient to support its own weight while remaining in the same position.

In some cases the pressing-roller L may be dispensed with and the glass between the edges of the sections a may be smoothed down or removed by a suitable scraping-tool, or, as shown in Figs. 6 and 7, I may employ a slightly-modified construction of mold and arrange at the top of the sections a a pair of cutting-blades P, formed of copper or other suitable metal and adapted to be moved toward and from each other by hinged levers P'. Above the knives I sometimes provide a hopper R to guide the molten glass to the space between the sections a, and after the mold is filled the cutting-blades P are moved toward each other and the surplus glass is severed from the periphery of the pipe.

In order to form perfectly-tight and waterproof joints between the sections of a pipe or conduit, the annular flanges and recesses or sockets which are formed at the ends of the pipe-sections are finely ground after the pipe has been removed from the annealing-oven, and the joints so formed between the ground flange of one section and the ground recess of an adjacent section is of such nature that the use of cement may be dispensed with, although in most cases I prefer to employ some form of cement or binding agent to insure perfectly-tight joints.

Having thus described my invention, what I claim, and desire to secure by Letters Patent, is—

1. The process of manufacturing hollow glass articles, consisting in casting the glass to the hollow shape desired around a contractile core, and gradually permitting the shrinkage of the article while maintaining the hollow shape thereof by reducing the diameter of the core.

2. The process of manufacturing glass pipe, consisting in casting the glass to the shape of a pipe around a contractile core, compressing the glass while in a semiplastic condition and gradually permitting the shrinkage of the pipe while maintaining the hollow shape thereof by reducing the diameter of the core.

3. Apparatus for manufacturing glass pipe, consisting of a mold formed of a bottom section having separate top sections pivotally connected thereto and separated at their upper edges to form a pouring-space and a contractile core supported in the mold, in combination with means for removing the excess of glass from said pouring-space.

4. Apparatus for manufacturing glass pipe, consisting of a mold formed of a bottom section, having top sections hinged thereto and separated at their upper edges to form a pouring-space, and a contractile core supported in the mold, in combination with a roll operating in said pouring-space and whose periphery conforms to the exterior of the pipe.

In witness whereof I have hereunto set my hand this 11th day of October, A. D. 1897.

JAMES W. BONTA.

Witnesses:
EDMUND S. MILLS,
JNO. E. PARKER.